UNITED STATES PATENT OFFICE.

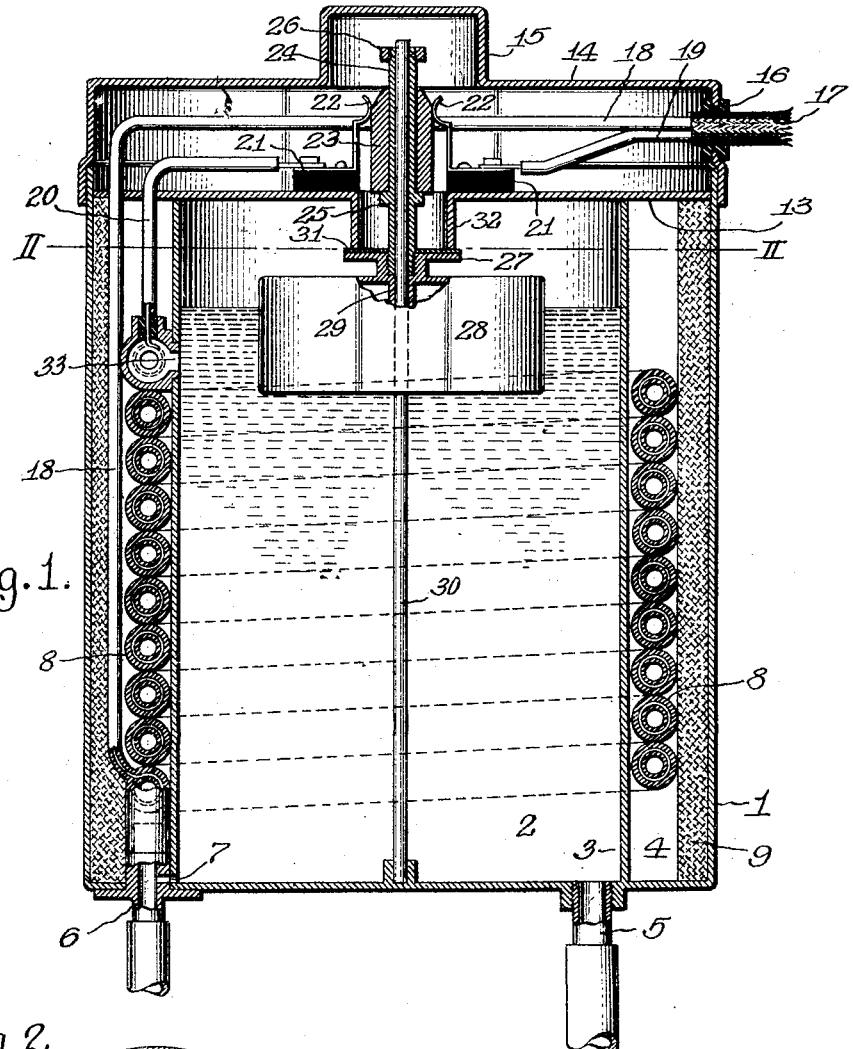
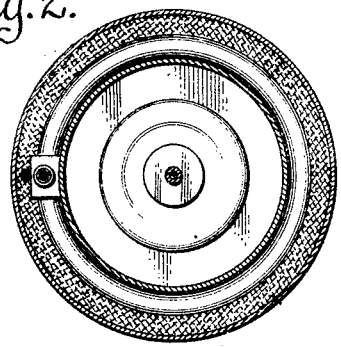
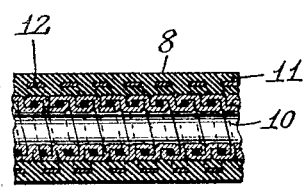

HERBERT W. CHRISTIAN, OF DETROIT, MICHIGAN.

ELECTRIC WATER-HEATER.

1,367,463.  Specification of Letters Patent.  Patented Feb. 1, 1921.

Application filed December 19, 1919. Serial No. 346,072.

*To all whom it may concern:*

Be it known that I, HERBERT W. CHRISTIAN, a citizen of the United States of America, residing at Detroit, in the county of Wayne and State of Michigan, have invented certain new and useful Improvements in Electric Water-Heaters, of which the following is a specification, reference being had therein to the accompanying drawings.

My invention aims to provide an electric water heater, compact in construction, durable and highly efficient as an instantaneous water heater that may be advantageously used in hospitals, residences, and generally any place where an ordinary lighting system or suitable source of electrical energy is convenient, the heating device being constructed so that it may be included in an electric circuit and the use of electricity automatically controlled so that there will be no waste and no attention on the part of an operator other than that of turning off and on the water to the heating device.

My electric water heater includes a reservoir and a water heating conduit compactly assembled relative thereto, the conduit being provided with an electric heating element adapted to heat water or other liquid as it passes through the conduit. In the reservoir is a float controlling an electric switch and by turning on and off the supply of water to the reservoir the float controls the use of electricity for heating the water as it flows through the conduit. All of these elements are very compactly assembled, and the construction entering into my invention will be hereinafter considered and then claimed.

Reference will now be had to the drawings, wherein—

Figure 1 is a vertical sectional view of a water heating apparatus;

Fig. 2 is a horizontal sectional view taken on the line II—II of Fig. 1, showing the apparatus on a smaller scale, and Fig. 3 is an enlarged longitudinal sectional view of a portion of the electrically heated water conduit.

The water heating apparatus comprises a cylindrical casing 1 containing a water reservoir 2, which may be formed by providing the casing with an annular inner shell 3 in spaced relation to the walls of the casing 1, so as to form an annular conduit chamber 4 about the reservoir, the purpose of which will hereinafter appear.

The bottom of the casing 1 is provided with a water inlet connection 5 communicating with the reservoir 2, and extending into the chamber 4 is a water outlet connection 6 carried by the bottom of the casing 1, said water outlet connection being of less diameter than the water inlet connection 5, so that there will always be a greater flow of water into the apparatus, particularly when placing the apparatus in operation by turning on the water supply thereto. The water outlet connection 6 communicates with the bottom of the reservoir 2 through a small port 7 and the inner end of the outlet connection 6 communicates with the lower convolution of a coiled electrically heated water conduit 8 which surrounds the reservoir 2 in the chamber 4 and is sandwiched between the shell 3 of the reservoir and a lining 9 of insulation or other material placed within the casing 1. The conduit 8 is made of a flexible metallic tube 10 surrounded by a body of insulation 11 and it is in this body of insulation that a resistance coil 12 is embedded, said resistance coil being in proximity to the walls of the flexible tube 10 so that the walls of said tube will be heated and the heat transmitted to water passing through said tube. The body of insulation 11 which surrounds the tube 10 may be made of any material that will permit of the flexible tube 10 being wound in coiled form, and such heat as is not conducted to the tube 10 may be disseminated in the chamber 4 and more or less heat the shell 3 of the reservoir 2. In some instances the chamber 4 may be completely filled with insulation material, in addition to the lining 9, so that the conduit will be firmly supported therein.

The reservoir 2 is of less depth than the casing 1, and the top of said reservoir is closed by a horizontal partition 13 that also closes the top of the chamber 4, said partition being in proximity to the upper edges of the casing 1. On the upper edges of the casing 1 is placed a detachable cover 14 having a central raised portion or dome 15. A wall of the cover 14 has an insulator 16 or a conductor 17, said conductor having leading-in wires 18 and 19, both of which are suitably insulated. The leading-in wire 18 extends downwardly in the chamber 4 and is connected to that end of the resistance coil 12 at the lowermost convolution of the coiled conduit, and the uppermost convolution of the conduit is connected by an insulated wire 20 to an electric switch, which is also connected to the leading-in wire 19. The electric switch is located on an insulator 21, carried by the partition 13, and said switch comprises opposed resilient contact arms 22 adapted to be electrically connected by a movable contact member 23, which is in the form of a sleeve having a tapered end so that it may wedge its way between the resilient contact arms 22. The sleeve contact member 23 is loose on a tubular holder 24 between a collar 25 and a nut 26 thereof, and said holder is connected to a closure member 27 of a float 28 within the reservoir 2. The float 28 is preferably cylindrical and hollow with a central guide 29 for a guide rod 30 which extends through the guide 29 and the holder 24 into the dome 15 of the cover 14. The rod 30 is supported axially of the reservoir 2 from the bottom of the casing 1 so that the float 28 may rise and fall according to the level of water within the reservoir. The closure member 27 of the float has a gasket or washer 31 adapted to close an air vent or connection 32 of the partition 13, said air vent or connection also providing clearance for the holder 24 of the contact member 23.

Considering the operation of the electric water heating apparatus, I will assume that the water is turned on to the inlet connection 5 and that the reservoir 2 contains a volume of water indicated in Fig. 1. Of course water will be flowing from the reservoir 2 through the conduit which has its upper convolution in communication with the upper part of the reservoir 2 through a port 33 and water is also passing through the port 7 into the outlet connection 6. The level of water is maintained within the reservoir 2 by reason of the inlet connection 5 being larger than the outlet connection 6, and the level of water within the reservoir will maintain the float 28 elevated with the collar 25 supporting the contact member 23 between the contact arms 22 of the electric switch, therefore the current is on and the resistance coil about the tube 10 is heating the water as it passes therethrough.

Assuming that the supply of water to the reservoir 2 is cut off, the level of water in the reservoir is lowered and consequently the float 28, but the contact member is frictionally held between the contact arms 22, until the level of water is below the port 33, when the float 28 causes the nut 26 to impinge against the upper end of the contact member 23 and impart sufficient impetus to said contact member to quickly break from between the contact arms 22. If the contact member 26 is fixed relative to the float 28 so as to move in synchronism therewith, then there would be a slow make and break connection with the electric switch, which is not a desideratum, so the contact member 23 has been made loose relative to the float 28, so as to be only controlled thereby at certain periods during the operation of the apparatus.

When the level of water within the reservoir 2 falls below the port 33 then the electric current to the conduit is cut off and the water within the reservoir 2 may slowly drain through the port 7 into the outlet connection 3, but if this outlet connection is provided with a conventional form of faucet or valvular member, then the reservoir 2 may be maintained filled to such an extent that the first quantity of water admitted to the reservoir will actuate the float and turn on the electrical current for heating the water.

I attach considerable importance to the fact that all of the elements of the apparatus are compactly assembled in a casing that may be suspended from or attached to a suitable support and that by installing the apparatus in a residence wired for electric lighting the occupant of the residence may have hot water when such residence is not otherwise equipped for furnishing the same.

It is thought that the operation and utility of the water heating apparatus will be apparent without further description, and while in the drawings there is illustrated a preferred embodiment of my invention, it is to be understood that the structural elements are susceptible to such variations and modifications as fall within the scope of the appended claims.

What I claim is:—

1. A water heating apparatus comprising a casing having a water inlet and outlet connection, a reservoir in said casing communicating with water inlet and outlet connections thereof, an electrically heated conduit in said casing having its upper end communicating with the upper portion of said reservoir, and its lower end connected to the water outlet connection of said casing, and means in said casing actuated by the contents thereof adapted to control the heating of the electrically heated conduit.

2. An apparatus as characterized in claim 1, wherein the electrically heated conduit is coiled about the reservoir and includes a flexible tube surrounded by a resistance coil.

3. An apparatus as characterized in claim 1, wherein said means includes an electric switch in said casing and a float in said reservoir, adapted to open and close said switch.

4. A water heating apparatus comprising a reservoir having a volume of water normally therein and adapted to have water flow therethrough, an electrically heated conduit adapted to receive water from said reservoir, a switch controlling the heating of said electrically heated conduit, and a float in said reservoir provided with a loose contact member adapted to be temporarily held by the switch and released by the float after a predetermined movement thereof.

5. A water heating apparatus comprising a reservoir, an electrically heated conduit about said reservoir and having its upper end communicating with the upper portion of said reservoir, a switch controlling the heating of said electrically heated conduit, and means in said reservoir adapted to operate said switch.

6. An apparatus as characterized in claim 5, wherein said means is movable in one direction to close said switch and has a predetermined return movement before said switch is opened thereby.

7. An apparatus as characterized in claim 5, wherein said reservoir has water inlet and outlet connections with the inlet connection greater than the outlet connection.

8. A water heating apparatus comprising a reservoir having a volume of water normally therein and adapted to have water flow therethrough, an electrically heated conduit adapted to receive water from said reservoir, and means controlled by the volume of water in said reservoir for controlling the heating of the electrically heated conduit.

In testimony whereof I affix my signature in the presence of two witnesses.

HERBERT W. CHRISTIAN.

Witnesses:
 KARL H. BUTLER,
 ANNA M. DORR.